Oct. 22, 1968 J. L. CRAFT 3,407,391

COMPUTER INPUT CHANNEL

Filed March 28, 1966 5 Sheets-Sheet 1

INVENTOR
JOHN L. CRAFT

BY John J Goodwin
ATTORNEY

Oct. 22, 1968 J. L. CRAFT 3,407,391

COMPUTER INPUT CHANNEL

Filed March 28, 1966 5 Sheets-Sheet 2

United States Patent Office 3,407,391

Patented Oct. 22, 1968

3,407,391

COMPUTER INPUT CHANNEL

John L. Craft, Beacon, N.Y., assignor to International Business Machines Corporation, Armonk, N.Y., a corporation of New York Filed Mar. 28, 1966, Ser. No. 538,058
8 Claims. (Cl. 340—172.5)

ABSTRACT OF THE DISCLOSURE

A computer input channel system for in-line, real time data reduction which includes a data register which receives input data words, and a channel address counter which increments and provides a series of ascending addresses of storage in which the data words are stored. A matrix type switching arrangement is provided which receives the input data words and is capable of transferring such data words to either the data register, the channel address counter or both. The system can be advantageously employed to use data words as addresses, to produce distribution diagrams, provide mapping, etc.

The present invention relates to a data processing system and more particularly to a computer input channel for data handling during real time acquisition of data. The term "real time acquisition of data" as used in the present discussion relates to the obtaining of data for computer processing as the data occur, for example, performing a scientific experiment and having the resultant data transferred directly from the instrumentation to a computer as such data occur. When quantities of data are acquired in real time, it is generally desired that such data be organized in some given order in the computer. Heretoforce, the usual way of accomplishing this result was to store the data in a core storage and then subsequently organize it in orderly form. The present invention provides a unique input channel for a data processor computer which is located in line between the source of data and the data processor and performs a real time organizing function for the data before it is introduced into the data processor.

By use of the present invention acquired data may be organized for plotting purposes, thus simplifying the preparation of mass distribution diagrams, histograms, and the like. The acquired data are organized in-line into a matrix format simplifying the study of row or columnar features of the acquired data. In addition, the acquired data may be mapped or transformed. The present invention will be described with respect to an embodiment of a typical data channel. A data channel is a unit which contains all the registers and controls to either read or write information on a data processor input/output unit.

An object of the present invention is to provide a computer input channel for in-line data reduction.

Another object of the present invention is to provide a computer input channel for the real time acquisition of data.

Still another object of the present invention is to provide a computer input channel for utilizing data input signals as storage address signals.

A further object of the present invention is to provide a computer input channel including a data register, an address register, a matrix switch, and input terminals such that the signal on any input terminal may be connected to any data register position or any address register position in accordance with connections of the matrix switch.

The foregoing and other objects, features and advantages of the invention will be apparent from the following more particular description of a preferred embodiment of the invention, as illustrated in the accompanying drawings.

Figure 1:
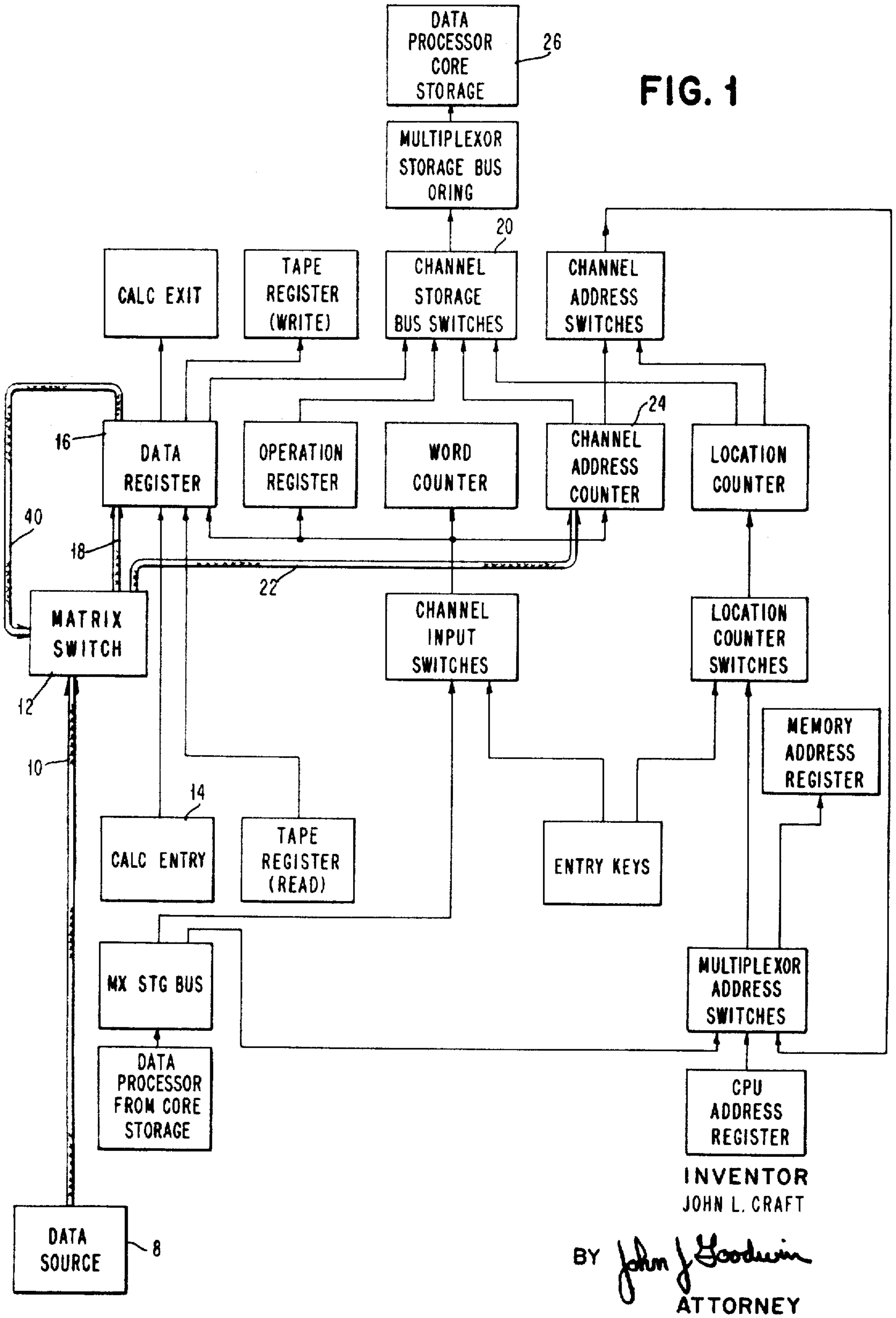
FIG. 1 is a block diagram of an embodiment of a computer input channel following the principles of the present invention.
Figures 2, 2A:
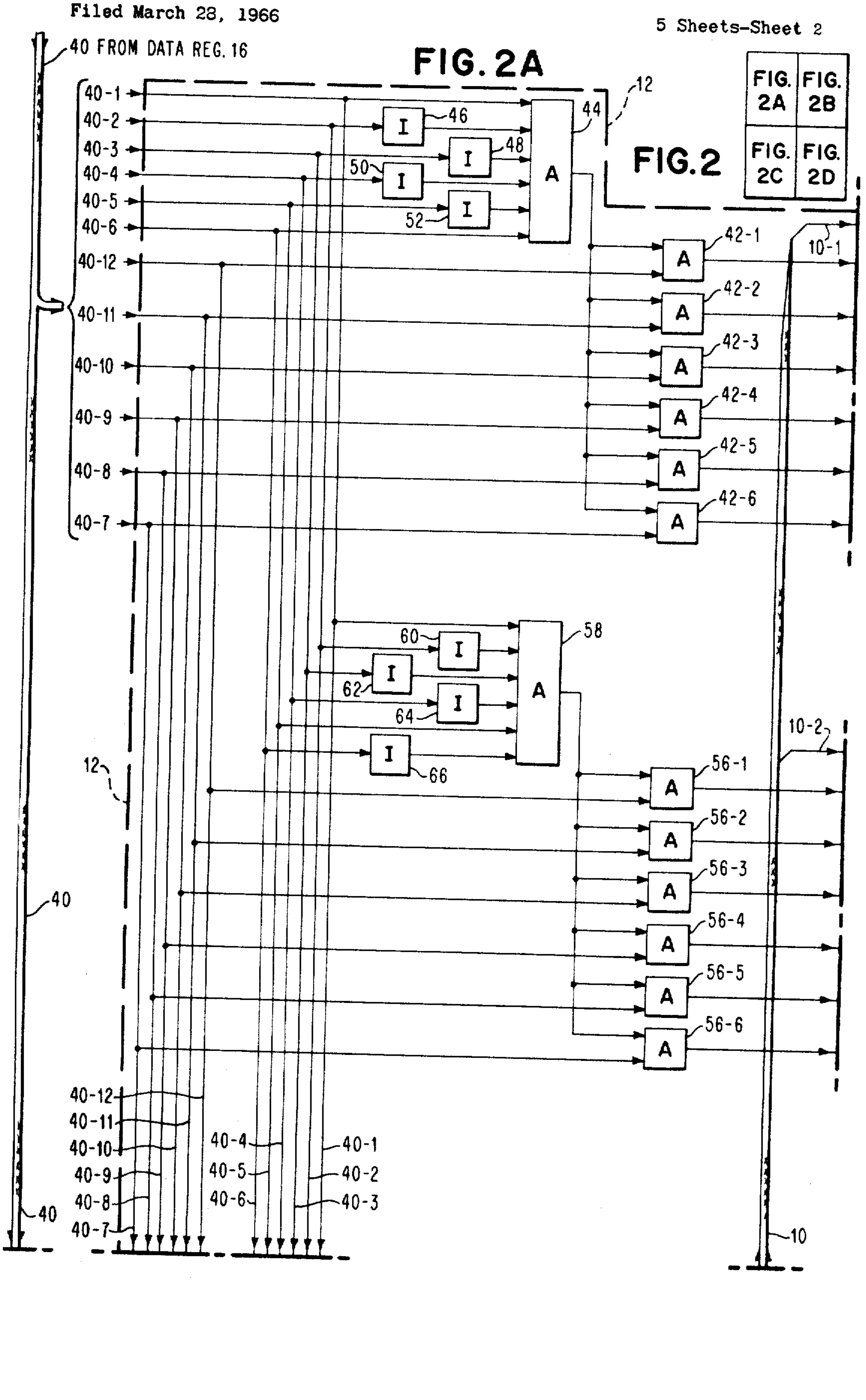
FIG. 2 illustrates how FIGS. 2A, 2B, 2C, and 2D should be combined.

FIGS. 2A through 2D, arranged as shown in FIG. 2 is a detailed schematic diagram of an embodiment of a matrix switch which may be employed in the system of FIG. 1.

Referring to FIG. 1 a data channel is shown which, with the exception of the functional block entitled "matrix switch 12" and cables 18, 22, and 40, is a conventional I.B.M. 7607 Model II Data Channel with Direct Data Connection RPQ M 9076.

In FIG. 1 a data acquisition input cable 10 (having fifty-one lines) is connected to a matrix switch 12. Heretofore cable 10 would have been connected to a calc entry 14 which acts as an interface for the data register 16 but there is no way to directly reach the addressing means which is the channel address counter 24. The data register 16 is a thirty-six position register, each position consisting of one negative trigger 16–1 through 16–36. The data register 16 has input connections from various functional units in the data channel, however, with the exception of the connection from the matrix switch such input connections are not pertinent to the present invention. It was previously stated that matrix switch 12 is connected to fifty-one input lines in the data acquisition input cable 10. The matrix switch 12 also has an output cable 18 having thirty-six output lines which are connected to the thirty-six positions 16–1 through 16–36 of data register 16. The output side of data register 16 is connected to various functional elements of the data channel for use in various modes of operation, however, the connection employed in the operation of the present invention is the connection to the input of channel storage bus switches 20 because this is the connection used when it is desired to store the contents of the data register in core storage 26. The remaining fifteen lines from the matrix switch 12 are connected via cable 22 to a channel address counter 24. Channel address counter 24 is a fifteen position counter, each position consisting of a negative binary trigger (24–1 through 24–15) connected to a separate one of the fifteen leads in the cable 22 from matrix switch 12. The thirty-six positions of data register 16 are also connected back to matrix switch 12 via cable 40. The channel address counter 24 conventionally provides the address or location where the contents of the data register 16 is to be stored in the core storage 26. Each time the contents of the data register 16 are transferred to the core storage, the channel address counter 24 was heretofore stepped up one time. In this manner, the previous operation of the data channel was such that the words entered into the core storage from the data register 16 were stored at sequential ascending addresses. To summarize the operation of the data channel prior to the modification provided by the present invention, acquired data (coded into thirty-six bit words) was applied through the calc entry 14 to the data register 16 where it was stored in the thirty-six position register. A storage cycle then occurs and the word in the data register 16 is switched through the channel storage bus switches 20 and is stored in the central core storage 26 at a core storage address specified by the channel address counter 24. For each word stored, the channel address counter 24 is advanced by one so that the acquired data words are stored in an ascending sequence of core storage addresses. If any matrixing or transforming is desired, it could not be accomplished in-line during real time, but instead an auxiliary storage device would be required and the transforming done by transferring the data words which are stored in the core 26 to other addresses in the auxiliary storage device at a loss of time and storage capacity. In the present invention, however, the acquired data is applied to a matrix switch 12. The matrix switch 12 permits any input bit of the acquired data word to be connected to any individual register position of either the data register 16 or the channel address counter 24. Thus, the acquired data word can be treated as either a core storage address of as the core storage content or any combination thereof in real time. The channel address counter is inhibited so that its usual operation of advancing or stepping once for each stored word is eliminated.

Figure 2B:
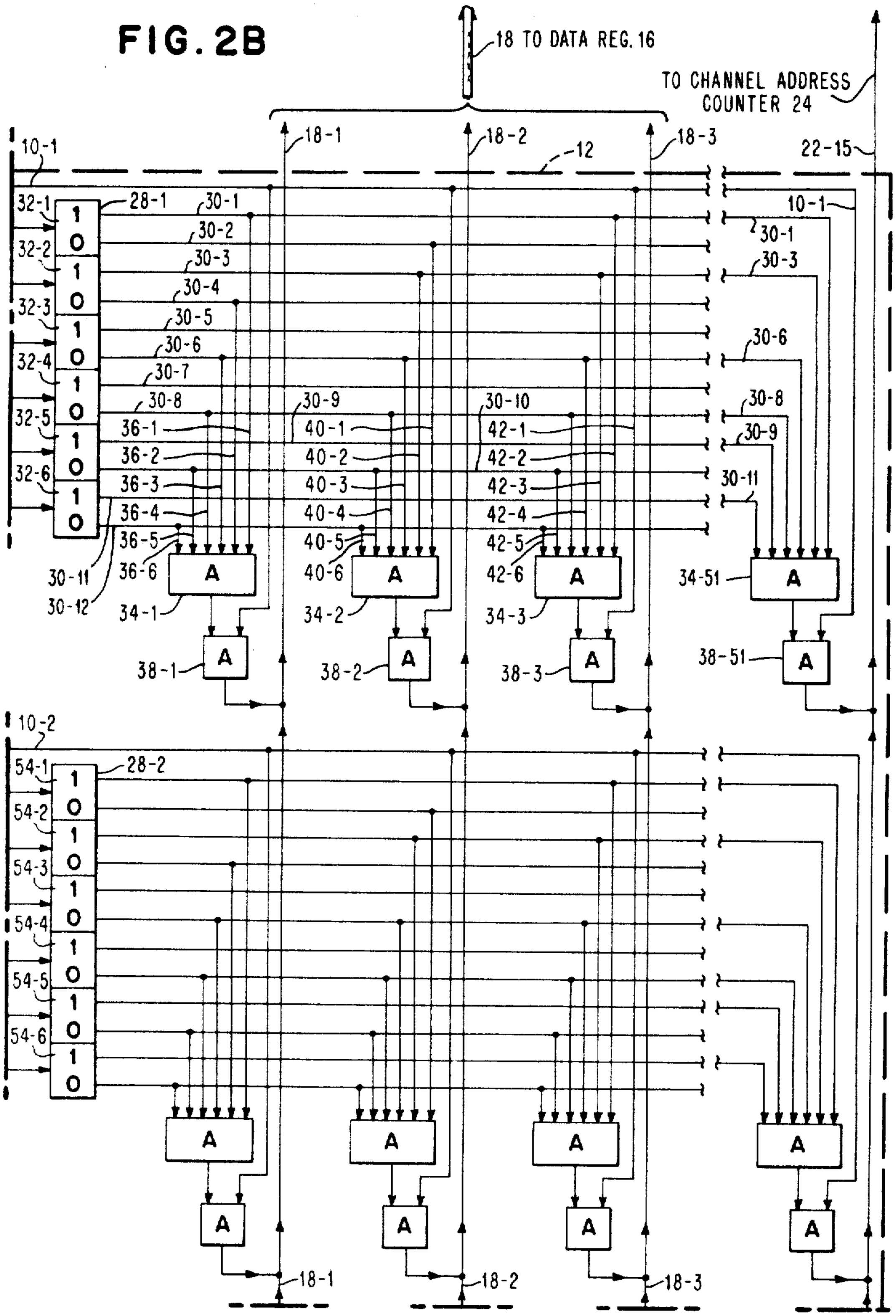
Figure 2C:
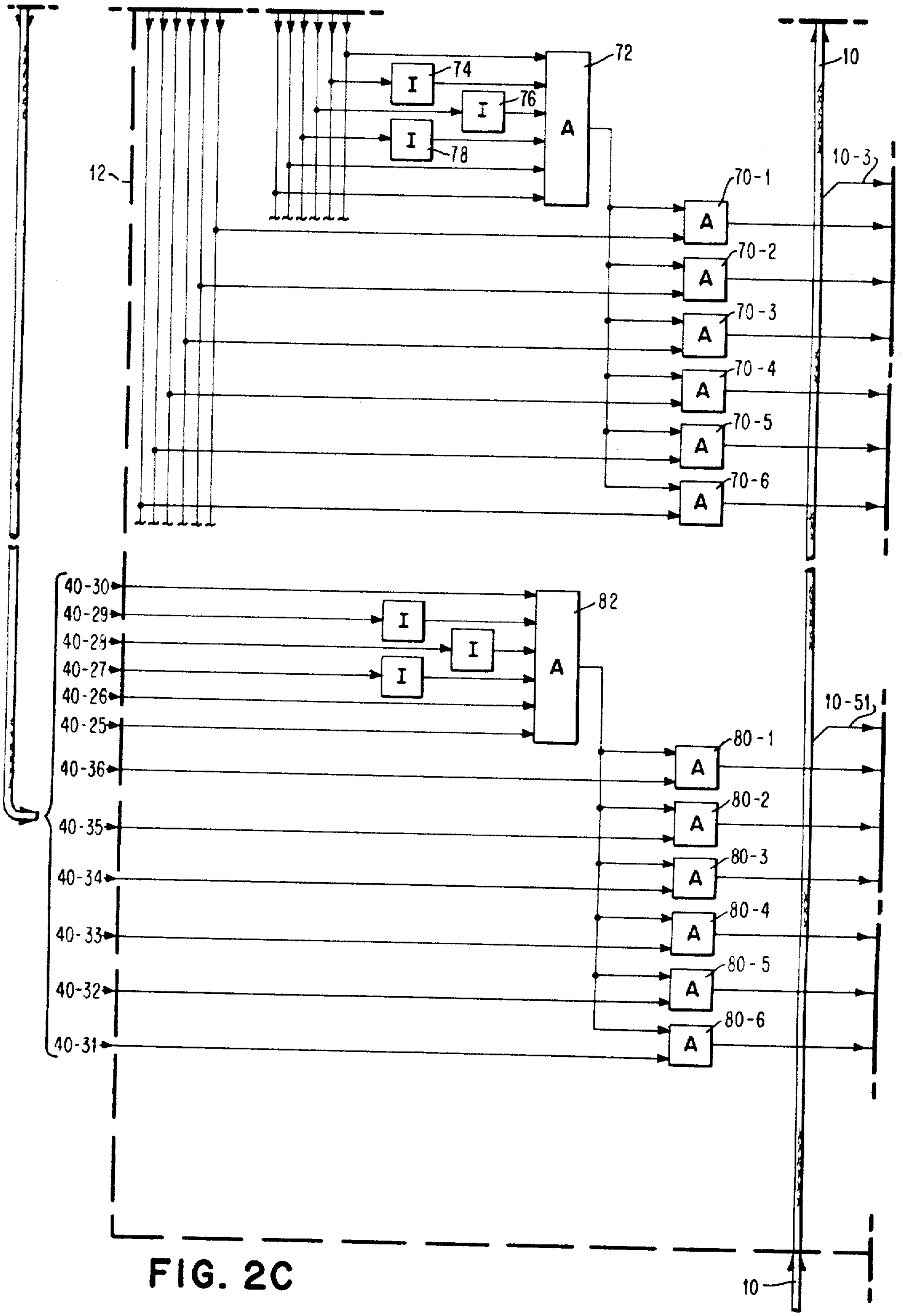
Figure 2D:
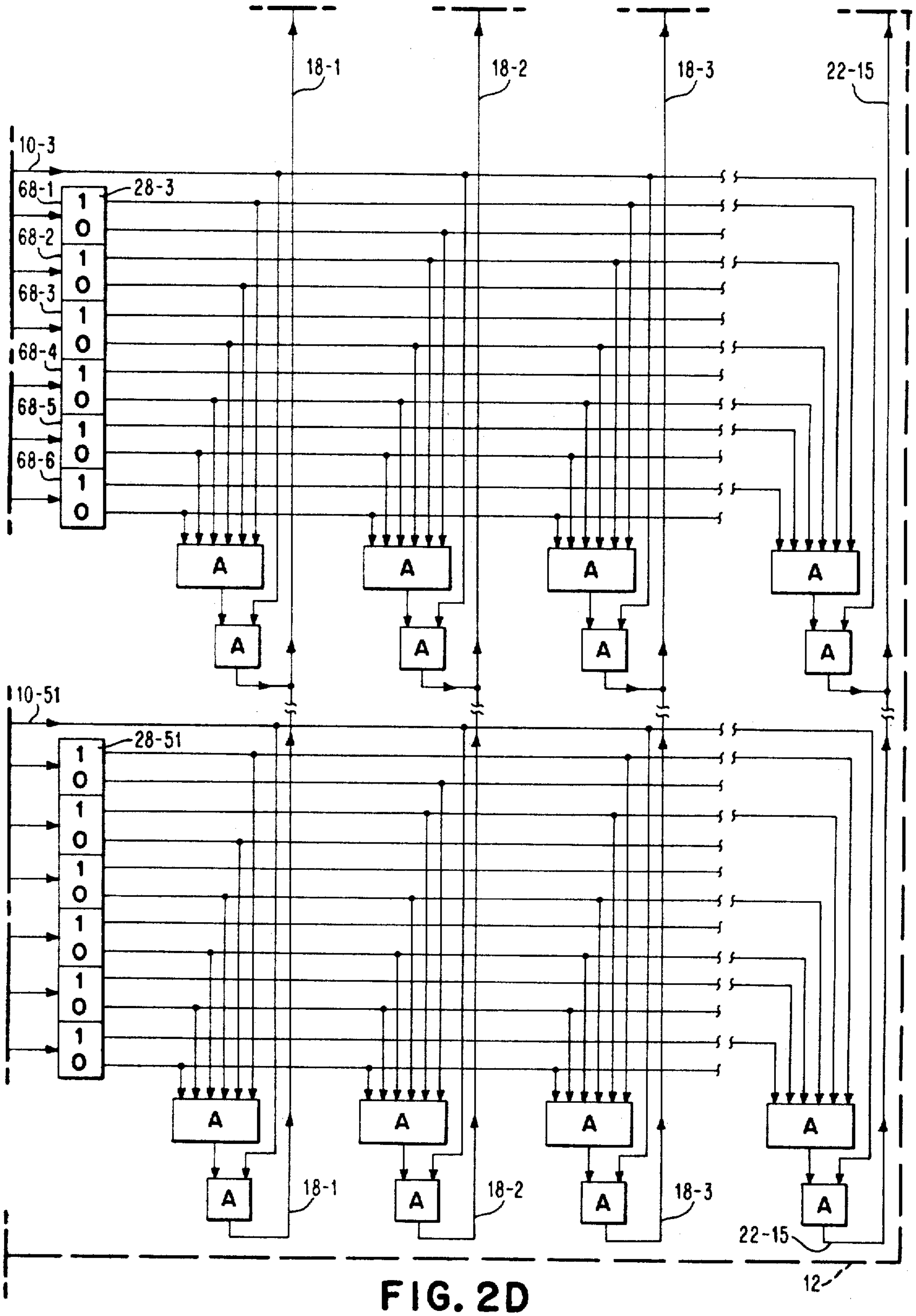

Referring to FIGS. 2A through 2D (assembled as shown in FIG. 2), an embodiment of matrix switch 12 is shown. The matrix switch is designed to couple the signals on the fifty-one input leads 10–1 through 10–51 to the fifty-one output leads 18–1 through 18–36 and 22–1 through 22–15 from the matrix switch 12. As shown in FIG. 1 the leads 18–1 through 18–36 in cable 18 are connected to data register 16 and leads 22–1 through 22–15 in cable 22 are connected to a channel address counter 24. In the matrix switch 12 there is a switching means located at every possible intersection or cross-point of the fifty-one input leads and the fifty-one output leads for a total of 2601 switching means. In FIGS. 2B and 2D the switching means are shown arrayed in horizontal rows and vertical columns. Associated with each horizontal row is a separate one of fifty-one registers 28–1 through 28–51. Each of the registers 28–1 through 28–51 consists of six conventional flip-flops which may be set to either one of two possible states. Each flip-flop of each register has a first output lead which contains a signal when the flip-flop is set to its "1" state and a second output lead which contains a signal when the flip-flop is set to its "0" state. Referring to register 28–1, therefore, it is seen that there are twelve output leads designated 30–1 through 30–12 from the six flip-flops designated 32–1 through 32–6. Each switching means previously referred to includes a first and second AND circuit. There are fifty-one such switching means for each horizontal row of the matrix. In each row of the matrix each switching means is designed to respond to a separate one of fifty-one binary digital words having values one through fifty-one. For example, in the first row of the matrix a six-way AND circuit 34–1 is connected to the output leads from register 28–1. The first input lead 36–1 to AND circuit 34–1 is connected to the "1" output lead 30–1 from register 28. The remaining input leads 36–2 through 36–6 of AND circuit 34–1 are connected to "0" output leads 30–4, 30–6, 30–8, 30–10, and 30–12, respectively, from register 28–1. AND circuit 34–1 therefore is responsive to a binary word "000001" from register 28–1. The output of AND circuit 34–1 is connected to AND circuit 38–1, the other input to AND circuit 38–1 is connected to input lead 10–1 of cable 10. The output of AND circuit 38–1 is connected to output lead 18–1. Thus, if an input signal were present on input lead 10–1 and if register 28–1 were set to the binary word "000001," then AND circuits 34–1 and 38–1 would be gated and a signal would be applied on output lead 18–1.

The second switching means in the first row includes a six-way AND circuit 34–2 and a two-way AND circuit 38–2. The input leads 40–1 through 40–6 of AND circuit 34–2 are connected respectively to output leads 30–2, 30–3, 30–6, 30–8, 30–10, and 30–12 from register 28–1. Thus AND circuit 34–2 will be gated when the binary word "000010" (two) is present in register 28–1. The output of AND circuit 34–2 is connected to AND circuit 38–2 and the other input to AND circuit 38–2 is connected to input lead 10–1. Thus, if the binary word "000010" is present in register 28–1 and there is an input signal on lead 10–1, the input signal on lead 10–1 will be connected to output lead 18–2.

The third switching means in the first row also includes a six-way AND circuit 34–3 which is also connected to the output leads from register 28–1. The input leads to AND circuit 34–3 (leads 42–1 through 42–6) are connected respectively to the output leads 30–1, 30–3, 30–6, 30–8, 30–10, and 30–12 from register 28–1. Thus, AND circuit 34–3 will be gated when the binary word "000011" (three) is present in register 28–1. The output of AND circuit 34–3 is connected to the input of two-way AND circuit 38–3, the other input of which is connected to lead 10–1. Thus, if register 28–1 contains the binary word "000011" and there is an input signal present on lead 10–1, the input signal will be connected to output lead 18–3.

It follows in similar progression that the next or fourth switching means in the first row also includes a six-way AND circuit which is connected to the output of register 28–1 and is responsive to the value "four" (000100) and serves to gate the signal on input lead 10–1 to the output lead 18–4. The remaining switching means in the first row are responsive to the values five, six, seven, eight, nine, etc., when such are present in binary form in register 28–1 and serve to respectively connect the signal on lead 10–1 to the output leads 18–5, 18–6, 18–7, 18–8, 18–9, etc. The last switching means in the first row includes a six-way AND circuit 34–51 which is responsive to a binary value fifty-one (110011) and therefore is connected to output leads 30–1, 30–3, 30–6, 30–8, 30–9, and 30–11 of register 28–1. Thus, if register 28–1 contains the binary word "110011," AND circuit 34–51 would be gated. The output of AND circuit 34–51 is connected to AND circuit 38–51 whose other input is connected to input lead 10–1. Thus, if the value fifty-one was present in the binary form in register 28–1, input lead 10–1 would be connected to output lead 22–15 which is the fifty-first output lead from matrix switch 12.

What has been described is a switching arrangement wherein a single input lead 10–1 may be selectively connected to any one of fifty-one output leads 18–1 through 18–36 and 22–1 through 22–15. Each of the remaining fifty rows of the matrix switch 12 serves in a like manner to connect a separate one of the fifty-one input leads 10–2 through 10–51 to any one of the fifty-one output leads 18–1 through 18–36 and 22–1 through 22–15. Each of the horizontal rows includes a register and the first switching means of each row is responsive to the value "one" set forth in the register in binary form (000001) to gate the signal on the associated input lead to the first output lead 18–1, the second switching means in each row is responsive to the value "two" as set forth in binary form (000010) in the associated register to gate the signal on the associated input lead to the output lead 18–2, and so on for each switching element of each row until the last switching element of each row which is responsive to the value "fifty-one" in the binary orm (110011) in the associated register to gate the signal on the associated input to the output lead 22–15. Thus, the signal on any one of the fifty-one input leads 10–1 through 10–51 may be connected to any one of the thirty-six register positions 16–1 through 16–30 in data register 16 or the fifteen register positions 24–1 through 24–15 in channel address counter 24 via output leads 18–1 through 18–36 and 22–1 through 22–15, respectively.

From the preceding discussion it is seen that there are fifty-one six-bit registers (28–1 through 28–51), one register associated with each of the input lines (10–1 through 10–51) to be switched. The number contained in each register is a binary encoding of the column representative of the output line number that its associated input line is to be connected to. At each row and column cross-point there is a gating means that is enabled when the associated register contains the number for that column cross-point and a signal on the associated input line is then connected to the associated output line. A discussion now follows describing the means for establishing the binary-coded numbers in the registers 28–1 through 28–51.

In order to operate the crosspoint switching means under program control, a sequence of control words must be transmitted from the data processor to the Data Channel and eventually, to registers 28–1 through 28–51. The numbers having been placed in the registers, the output lines of the registers will enable one of the switching means in each row and permit information signals from given ones of input lines 10–1 through 10–51 to be gated to predetermined ones of output lines 18–1 through 18–36 and for the embodiment chosen (I.B.M. 7607 Data Channel), any "control" words (i.e., six-bit input words to registers 28–1 through 28–51) transmitted from the data processor could enter into the data register 16. A write select (WRS) instruction is included with the control words entered in sequence in the data register 16 so that they may be interpreted as control words instead of actually being written as data words. The technique of using the "write select" instruction is known and has been employed in the I.B.M. 7607 Data Channel System in a data-gathering environment, the mode being possible because the system is always reading and writing is defined only for transmission of control words.

Thus control words are transmitted from the data processor, under the direction of the stored program, and the words appear in the data register 16. Consider now the fifty-one six-bit registers 28–1 through 28–51. Both the values fifty-one and thirty-six are divisible by three, therefore the fifty-one six-bit registers 28–1 through 28–51 can be separated into three seventeen-register groups. Separate also the thirty-six storage locations 16–1 through 16–36 of the data register 16 into three twelve-bit groups, each of the three twelve-bit groups to be associated with a separate one of the three seventeen-register groups.

More particularly, consider that the bits in the thirty-six bit positions 16–1 through 16–36 of the data register 16 are separated in group I (16–1 through 16–12), group II (16–13 through 16–24), and group III (16–24 through 16–36). For each twelve-bit group of the data register 16, the low-order six-bits represent the particular number to be placed in the registers that gate and hold a switching circuit to form a connection to an output line of the matrix; the next five bits in increasing order specify which of the 28–1 through 28–51 registers is to be loaded with the number contained in the six low-order bits.

This means that the six bits from positions 16–7 through 16–12 specify the number to be placed in a register of group I and the five bits from positions 16–2 through 16–6 (control bits) specify which register in group I (28–1 through 28–17) is to have the number entered. The six bits from positions 16–19 through 16–24 specify the number to be placed in a register of group II and the five bits from positions 16–14 through 16–18 (control bits) specify which register in group II (28–18 through 28–34) is to have the number entered, and the six bits from positions 16–31 through 16–36 specify the number to be placed in a register of group III and the five bits from positions 16–26 through 16–30 (control bits) specify which register (28–35 through 28–51) is to have the number entered. Thus for each thirty-six bit control word placed in the data register 16 by the processor, a maximum of three connections, one in group I, one in group II, and one in group III may be established.

Since each thirty-six bit word from data register 16 sets a maximum of three registers (one in each group) a total of seventeen words are required from data register 16 for a complete change or new loading of all fifty-one registers 28–1 through 28–51. This method permits the six-bit registers 28–1 through 28–51 to be selectively loaded, changed, or reset without altering other register settings and without having to reset and reload all the other registers to change the contents of one of the registers.

From the preceding discussion it is seen that the data register 16 bit positions 16–7 through 16–12 must be connected to the inputs of all the registers 28–1 through 28–17 of group I, the bit positions 16–19 through 16–24 must be connected to the inputs of all the registers 28–18 through 28–34 of group II, and the bit positions 16–31 through 16–36 must be connected to the inputs of all the registers 28–35 through 28–51 of group III. The aforesaid bit positions are arranged in conventional binary code. Thus, considering group I, if bits in positions 16–7 through 16–12 were "000001," the number represented would be "one" and so on up to "110011" representing "fifty-one." If bits in positions 16–2 through 16–6 were "00001," the first register (28–1) would have the number represented by bits in positions 16–7 through 16–12 entered therein, and so on up to "10001" which designates the seventeenth register (28–17) as having the number represented by bits in positions 16–7 through 16–12 entered therein.

It is noted that no significance has been assigned to bit positions 16–1, 16–13, and 16–25. In a given instance it is desirable that a register in a group be reset, and in another instance that a register remain unchanged, i.e., continue to hold the number present set therein. In the present embodiment all "0" bits in the six low order bits of each group are used to represent "reset" and can be selectively applied to any register in the group by use of the next five higher order control bits. For example, if bits in positions 16–7 through 16–12 were all "0's," any register 28–1 through 28–17 could be reset by designation of control bits in positions 16–2 through 16–6.

If all the registers in a group are to be reset at once, this is designated by all "0" control bits. Thus, positions 16–2 through 16–6 having all "0's" will reset registers 28–1 through 28–17, positions 16–14 through 16–18 having all "0's" will reset registers 28–18 through 28–34, and positions 16–20 through 16–30 having all "0's" will reset registers 28–35 through 28–51. This presents the problem wherein it is desired to change a register in one group (i.e., group I or III, or both while not changing the registers in group II). This requires that no group II registers be designated, a condition which requires all "0" bits in bit positions 16–14 through 16–18. However, this is the same condition for resetting all registers in group II. The problem is the same in order to maintain the registers of the other groups unchanged. The solution is provided by the use of bits from positions 16–1, 16–13, and 16–25. All "0's" in bit positions 16–2 through 16–6 plus a "1" in bit position 16–1 means reset registers 28–1 through 28–17 whereas plus a "0" in bit position 16–1 means "no change" for registers 28–1 through 28–17. Likewise, all "0's" in positions 16–14 through 16–18 plus a "1" in position 16–12 means reset registers 28–18 through 28–34, but plus a "0" in position 16–12 means "no change" for registers 28–18 through 28–34 and all "0's" in positions 16–26 through 16–30 plus a "1" in position 16–25 means reset registers 28–35 through 28–51 but a "0" in position 16–25 means "no change" for registers 28–35 through 28–51. If the control bit(s) in positions 16–1, 16–13, or 16–25 are "0," no change occurs regardless of what the other eleven bits in the associated group might be.

Referring to FIGS. 2A and 2C, the logic circuit for setting up the registers 28–1, 28–2, 28–3 through 28–51 is shown. The six flip-flops 32–1 through 32–6 of register 28–1 are connected respectively to the outputs of AND circuits 42–1 through 42–6. One of the inputs of each of the AND circuits 42–1 through 42–6 is connected respectively to leads 40–12, 40–11, 40–10, 40–9, 40–8, and 40–7 of cable 40 from data register 16. Cable 40 contains thirty-six leads 40–1 through 40–36 which are respectively connected to data register positions 16–1 through 16–36. The other input leads of each of the AND circuits 42–1 through 42–6 are connected to the output lead from AND circuit 44. AND circuit 44 is connected directly to leads 40–1 and 40–6 of cable 40 from data register 16 and to leads 40–2 through 40–5 of cable 40 from data register 16 via inverter circuits 46, 48, 50, and 52, respectively. Thus, a control word "0001" on leads 40–2 through 40–6 from data register positions 16–2 through 16–6 in combination with a one bit on lead 40–1 (from data register position 16–1) will gate AND circuit 44 and condition AND circuits 42–1 through 42–6. The second register in group I, i.e., register 28–2, has its six flip-flops 54–1 through 54–6 connected respectively to the outputs of AND circuits 56–1 through 56–6. One input of each of the AND circuits 56–1 through 56–6 are also respectively connected to the leads 40–12, 40–11, 40–10, 40–9, 40–8, and 40–7. The other input lead of each of the AND circuits 56–1 through 56–6 are connected to the output of AND circuit 58. The input to AND circuit 58 is connected directly to leads 40–1 and 40–5 from data register positions 16–1 and 16–5 and to leads 40–2, 40–3, 40–4, and 40–6 from data register positions 16–2, 16–3, 16–4, and 16–6 through inverter circuits 60, 62, 64 and 66, respectively. Thus AND circuit 58 will be gated by a control word "00010" from the data register positions 16–2 through 16–6 in combination with a 1 bit on lead 40–1. The gating of AND circuit 58 will condition AND circuits 56–1 through 56–6. In like manner, the flip-flops 68–1 through 68–6 of register 28–3 are connected to the outputs of AND circuits 70–1 through 70–6, which in turn each have one input lead respectively connected to one of the leads 40–7 through 40–12 from data register 16 and the other input connected to AND circuit 72. AND circuit 72 is connected to leads 40–1 through 40–6 from data register position 16–1 through 16–6 with leads 40–2, 40–3, and 40–4 including respectively inverter circuits 74, 76, and 78 so that AND circuit 72 will be gated by a control word "00011" from data register positions 16–2 through 16–6 in combination with a 1 bit on lead 40–1. The gating of AND circuit 72 will condition AND circuits 70–1 through 70–6. Thus, the word on lead 40–7 through 40–12 can be connected to register 28–1 by means of a control word having a value "one" on leads 40–2 through 40–6, or to register 28–2 by means of a control word having a value "two" on leads 40–2 through 40–6, or to register 28–3 by means of a control word having a value "three" on leads 40–2 through 40–6. The leads 40–7 through 40–12 extend and are connected to six AND circuits at the interface of each of the remaining registers 28–4 through 28–17 (not shown). Six AND circuits, similarly provided at each of the inputs of registers 28–4 through 28–17 are conditioned via an AND circuit which is responsive to signals on leads 40–1 through 40–6. Register 28–4 will be conditioned via a data pattern "00100" (four) on leads 40–2 through 40–6. Register 28–5 will be conditioned via control word "00101" (five) on leads 40–2 through 40–6 and so on down to register 28–17 which has a similar arrangement of AND circuits which will gate signals from data register positions 16–7 through 16–12 on leads 40–7 through 40–12 in response to a control word "10001" (seventeen) on leads 40–2 through 40–6.

The portions of the logic circuits associated with the registers 28–4 through 28–50 which are not shown in FIG. 2C can be simply extrapolated. Each of the remaining registers in group I (i.e., registers 28–4 through 28–17) include an AND circuit arrangement at its input as shown for registers 28–1 through 28–3. The six AND circuits preceding each register 28–4 through 28–17 are connected to the leads 40–7 through 40–12 from data register positions 16–7 through 16–12. The other inputs to each group of six AND circuits are connected to an AND circuit and each of such AND circuits are connected to leads 40–1 through 40–6 from data register 16. Each of such AND circuits are preceded by selected combinations of inverter circuits such that the AND circuits connected to the input of register 28–4 are gated upon the occurrence of a control signal having a value "four" on leads 40–2 through 40–6 in combination with a one bit on lead 40–1 and the AND circuits connected to the input of the register 28–5 are gated upon the occurrence of a control word of value "five" on leads 40–2 through 40–6 in combination with a one bit on lead 40–1, and so on to the last register 28–17 in group I which is preceded by AND circuits which are gated by a control word of value "seventeen" on leads 40–2 through 40–6 in combination with a one bit on lead 40–1. Each of the registers in group II (i.e., registers 28–18 through 28–34) are preceded by six AND circuits which are connected to leads 40–19 through 40–24 from data register 16, positions 16–19 through 16–24. Each of the groups of six AND circuits associated with the registers in group II are connected to the output of a separate AND circuit and such AND circuits are connected to leads 40–13 through 40–18 from data register positions 16–13 through 16–18. The AND circuits associated with the first register of group II (i.e., register 28–18) are gated by a control word of value "one" appearing on leads 40–14 through 40–18 in combination with a one bit on lead 40–13. The second register of group II (i.e., register 28–19) is preceded by six AND circuits which are gated by a control word of value "two" on leads 40–14 through 40–18 in combination with a one bit on lead 40–13, and so on to the last register of group II (i.e., register 28–34) which is preceded by AND circuits which are gated via control word "seventeen" appearing on leads 40–14 through 40–18 in combination with a one bit lead 40–13. The registers of group III (i.e., registers 28–35 through 28–51) are each preceded by groups of six AND circuits which have inputs connected to leads 40–31 through 40–36 from data register positions 16–31 through 16–36 and are also connected to separate AND circuits each of which is connected to leads 40–25 through 40–30 from data register positions 16–25 through 16–30. The six AND circuits associated with the first register of group III (i.e., register 28–35) are gated by a control word of value "one" appearing on leads 40–26 through 40–30, and so on in progression to register 28–51 which is shown in FIG. 2C preceded by six AND circuits 80–1 through 80–6 having inputs connected to leads 40–31 through 40–36 from data register positions 16–31 through 16–36 and also connected to an AND circuit 82 which is connected directly to leads 40–25, 40–26, and 40–30, and to leads 40–27, 40–28, and 40–29 via inverter circuits. Thus, AND circuit 82 is gated by a control word "10001" (seventeen) in combination with a one bit on lead 40–25 which in turn gates AND circuits 80–1 through 80–6 thereby entering the word appearing on leads 40–31 through 40–36 into register 28–51. Thus each of the registers 28–1 through 28–51 may be conditioned with a six bit binary word capable of representing values from "one" through "fifty-one" and that each of the registers 28–1 through 28–51 are each connected to fifty-one separate switching means which are responsive to a separate one of the values "one" through "fifty-one." Examples will now be provided showing the use of the present invention in instrument pattern environments in order to more clearly explain the invention and to demonstrate its efficiency.

Referring to FIG. 1 it was stated that input data is applied to the system via the fifty-one leads 10–1 through 10–51 and that the output leads from the matrix switch 12 are the thirty-six leads 18–1 through 18–36 which are connected to the positions 16–1 through 16–36 of the data register 16 and the fifteen leads 22–1 through 22–15 connected to the positions 24–1 through 24–15 of the channel address counter 24. The output leads 22–1 through 22–15 are connected respectively to the switching means in the thirty-seventh through fifty-first columns of the matrix switch. The previous discussion indicated how a signal on any one of the input leads 10–1 through 10–51 may be routed to any one of the output leads 18–1 through 18–36 and 22–1 through 22–15. Signals which are applied to leads 22–1 through 22–15 are connected as input signals to the channel address counter 24. The channel address counter 24 functions in the system as an address means for the core storage 26. Thus, if data signals are applied on any of the leads 10–1 through 10–51 and are routed via leads 22–1 through 22–15 to channel address counter 24 they will be treated as address words and specify locations in the core storage regardless of the fact that they actually represent data. Illustrations by way of typical examples will be given to demonstrate the advantages which may be realized by treating data signals as if they were core storage addresses.

However, before presenting examples wherein experimental data is utilized as direct core storage addresses, i.e., where data signals are routed to the fifteen positions 24–1 through 24–15 of channel address counter 24, the effect of partitioning the bits of the address field and assigning the partitions for the representation of various quantities should be discussed. A partition of a number is a collection of integers having as a sum the number to be partitioned, with the order of the integers not regarded. For example, the number 5 may be partitioned in seven ways, viz., (5) (4,1) (3,1,1) (2,1,1,1) (1,1,1,1,1) (3,2) (2,2,1). The fifteen data bits which can be employed as address bits in channel address counter 24 may be partitioned in one hundred and seventy-six different ways. Each partition element of the partition of the fifteen bits may be used to represent a variable with a resolution of the number of bits in the partition element. Consider one of the one hundred and seventy-six possible partitions, say (6,5,2,2). This is a partition of fifteen because 6+5+2+2=15. The fifteen bit word so partitioned is considered as consisting of four fields of six bits, five bits, two bits, and two bits, respectively. The six bit field may be used to uniquely represent sixty-four ($2^6$) values, the five bit field can uniquely represent $2^5$ or thirty-two values, etc. Assume that data from four input devices are to be gathered, and that data source 8 represents sources of temperature, pressure, quadrant number, and a measurement standard for a particular experiment. Temperature diffeences to one part in sixty-four can be sensed and digitized and the six bit result constitutes the six bit field of the fifteen bit partition; pressure differences of one part in thirty-two, or five bit resolution, would comprise the five bit field; a quadrant number for a two-dimensional space has one of four values and would utilize a two bit field and the ternary result of a comparison with some measurement standard (high, low, equal) would utilize the remaining two bit field. Thus at each measurement interval, fifteen bits are provided from data source 8 and are to be read into the channel address counter 24 with six bits being a digitized temperature value, five bits a digitized value of pressure difference, two bits an instantaneous value of spatial quadrant, and the remaining two bits representing a comparison with a standard for this particular measurement instant. The format might be as follows: the bits on leads 22–1 through 22–6, temperature data; the bits on leads 22–7 through 22–11, pressure difference data; the bits on leads 22–12 and 22–13, quadrant data; and the bits on leads 22–14 and 22–15, comparison result data. Because the contents of the channel address counter 24 specifies a core storage location, each core storage location will correspond to a particular 4-tuple of the four digitized experimental quantities. For a particular fifteen bit data word having values of temperature (53), pressure difference (22), spatial quadrant (03), and a "high" comparison, the (53) appears in channel address counter 24 positions 24–1 through 24–6 as "110101," the (22) enters positions 24–7 through 24–11 as "10110," quadrant (03) is entered in positions 24–12 and 24–13 as "10," and the "high" comparison is coded in positions 24–14 and 24–15 as "11." The occurrence of this particular data word at a measurement instant thus causes the positions 24–1 through 24–15 of the channel address counter 24 to become "110 101 101 101 011," reading left to right. Since the contents of the channel address counter 24 is treated as an address, the core storage location 65553 which is an octal number to the radix 8, is "reserved" for the coincident occurrence at a measurement interval of the data word having a temperature 53, pressure difference 22, quadrant 03, and a "high" comparison with respect to a standard reference.

Thus far, only a core storage location of core storage 26 has been specified; nothing has been said about the contents of the storage location. If at each measurement instant only a location is specified and no other action taken, because the location itself is transitive and is not stored, there would exist no record that the data word had occurred. One question of interest to the experimenter might be: "How many times during the complete experimental run has this particular data word occurred?" This recording is accomplished by the experiment specifying the core storage location as just described with the contents of the location extracted and incremented by unity, then replaced. Thus the contents of each storage location would contain a count of the number of occurrences of the coincident data word represented by that storage location.

The occurrence of a particular data word more than a specified number of times might be used to herald a critical point of the experiment. This would be accomplished by placing in the storage location corresponding to the particular data word of interest, before initiation of the experiment, the complement of the critical number. At each occurrence of the data word, the contents of the storage location is augmented by one with the presence of a high-order carry as result of the augmentation signalling that the prespecified threshold has arrived. Each storage location may have a different initial number placed in it as the thresholds for each data word may be different.

At the conclusion of the experimental run, the analysis procedure might be required to provide an answer to the question: "How often did the pressure difference having digitized value 22 occur?" Recalling that the contents of each storage location is a count of the number of times that the data word that specified that location occurred, the answer would be the sum of the content of all core locations having addresses of the form:

XXXXXX10110XXXX where the X's represent the bit positions 24–1 through 24–6 and 24–12 through 24–15 of channel address counter 24 and which may contain any possible bit patterns. In this manner, the program sums the contents of all locations wherein the pressure difference had the value 22. The summing of the contents of all addresses where the address has bits associated with leads 22–7 through 22–11 constant is readily accomplished with a simple indexed instruction loop whereas if the result at each measurement interval were placed in an ascending sequence of addresses, the content of every address would have to be examined for the pressure value of 22 and a tally made for each appearance. The partitioning of the address has thus performed a level of data reduction by grouping and organizing the acquired data. Notice also that in addition to this organization that facilitates later analyses, a useful data compression has occurred. If a given identical data word occurred one thousand times during the experimental run, placement into an ascending sequence of words would require that one thousand of the total words utilized would contain the identical data words whereas the embodiment compresses this occurrence into a count in one storage word.

A more complex analysis might involve calculating how many times temperature values eleven and fifty-one occurred in quadrant two. The program would then sum the contents of address sets 001011XXXXX01XX and 110011XXXXX01XX.

The preceding discussion illustrates how the system of the present invention may be utilized in an experiment such that certain experimental values specify a storage location and a count is made at that location for each occurrence of the $n$-tuple of experimental values. Experimental values were placed only in the channel address counter 24 with no bits routed to the data register 16. Another requirement might be that additional experimental values be placed at a storage location specified by other experimental quantities. This is readily accomplished but consideration must be given to the relation of the new contents of a storage location with regard to the former contents. If some of the experimental bits that are routed to the channel address counter 24 are from an irreversible experimental quantity (time, for example) no problem exists because during an experimental run that location will be referenced once and only once and no other data placed there. Prior to the experimental run, the storage is cleared to zeros. After the run, non-zero locations contain experimental data with the location itself having the experimental significance assigned.

If, however, a given *n*-tuple can occur several times during an experimental run, and it is desired to place experimental data at the location specified by a particular value of the *n*-tuple, some thought must be given to the relation between the former content and the latest point. One obvious relation is simply to store the new information, discarding the old. Thus the storage will always have the most current data as the contents of the storage locations. Another relation would be to add the new experimental value to the contents of the location, replacing the former contents with the new sum. In this manner, the contents of the storage location specified by an *n*-tuple contain a summation of measured values of experimental data.

An example will now be given illustrating how the present matrix switch aids in the production of a distribution diagram. An example of a one dimensional distribution diagram is a bar graph wherein separate experimental values are represented by separate points along the abscissa of the graph and the number of occurrences of the values are represented by the ordinates of the points. For two variables an X–Y plane is provided wherein points on the plane represent the simultaneous occurrence of separate X and Y values, and the height of a Z point above the plane over each X–Y point represents the number of occurrences of such X–Y values.

It is possible and usual to produce distribution diagrams by computer output by use of the printer. Positions along the width of the paper represent values of one variable and positions along the length of the paper represent the other variable. Simultaneous occurrences of the variables are represented by points within the plane of the paper, and the number of occurrences of the pairs of variables are represented by decimal numbers printed at such points on the plane. A typical diagram might be printed as shown:

| | $Y_1$ | $Y_2$ | $Y_3$ | $Y_4$ | $Y_5$ |
|---|---|---|---|---|---|
| $X_1$ | 9 | | 16 | | |
| $X_2$ | | | | | |
| $X_3$ | | | 24 | | |
| $X_4$ | | 52 | 58 | 47 | |
| $X_5$ | | | 12 | | 15 |

With the explanation of distribution diagrams being thus established a further example will now be provided of how a system employing the present invention is utilized. Consider that a nuclear physics fission experiment is being monitored such as the actual experiment described in the article, " 'On-Line' Operation of a Digital Computer in Nuclear Physics Experiments," by J. F. Whalen, J. W. Meadows, and R. N. Larsen, in The Review of Scientific Instruments, volume 35, Number 6, June 1964. In this experiment two fragments resulting from a fissioning nucleus produce two pulses which are functions of the fragment energies. The experiment equipment amplifies each pulse and each pulse is then digitized by a separate analog to digital converter to a seven bit digital signal. Thus it is presumed that two seven bit data signals representing each fragment pulse are available at data source 8 (FIG. 1) for each fission.

It will be presumed, that as a result of the input connections that the first fragment pulse is connected as a seven bit data signal to input leads 10–7 through 10–13 and that the second fragment pulse is connected as a seven bit data signal to input leads 10–29 through 10–32 and 10–35, 10–38, and 10–46 (the input lines were selected to be not contiguous to demonstrate the flexibility of the matrix switch). The first seven bit data signal is to be connected to channel address counter positions 24–1 through 24–7, thus input lines 10–7 through 10–13 must be connected to output leads 22–1 through 22–7. This means that registers 28–7 through 28–13 of matrix switch 12 which are associated with input leads 10–7 through 10–13 must be set to contain the words 100101, 100110, 100111, 101000, 101001, 101010, and 101011, respectively, which specifies the thirty-seventh through forty-third columns of the matrix switch 12 which are associated with output leads 22–1 through 22–7.

The second seven bit data word is desired to be connected to channel address counter positions 24–8 through 24–14, which means that the registers 28–29 through 28–32, 28–35, 28–38 and 28–46 (associated with input lines 10–29 through 10–32, 10–35, 10–38, and 10–46) must be set to contain the words 101100, 101101, 101110, 101111, 110000, 110001, and 110010, respectively, which specifies the forty-fourth through fiftieth columns of the matrix switch 12 which are associated with the output leads 22–8 through 22–14. The setting of the registers is accomplished as previously described.

Fourteen input data bits are transmitted for each fission and are connected to positions 24–1 through 24–14 of channel address counter 24 as stated and form a storage address. Each fission augments the content of the address by one. Considering that the seven bit word for the first fission fragment represents rows of the core storage ($2^7=128$ rows) and that the seven bit word for the second fission fragment represents columns of the core storage ($2^7=128$ columns) the storage can be conceptually organized into a 128 x 128 matrix of addresses with the value of each matrix position being a count of the number of times its address (i.e., a unique pair of fission energy pulse values) has occurred. Thus the data, being treated as addresses by the channel address counter 24, can be placed in core storage as a matrix of address occurrences. That is, the storage address itself represents the coordinates of a point of a two-dimensional distribution diagram and the content of the address represents the number of occurrences. The stored information can ultimately be printed out as a distribution diagram without the necessity of any analysis or sorting as would be required in a conventional input channel.

The preceding discussion related to an example wherein input data was routed to the channel address counter 24. A further example will now be provided wherein data is routed to both the data register 16 and the channel address counter 24.

Presume that the hypothetical experiment includes 4,096 photoconductors arranged in a 64 x 64 matrix, and that each photoconductor provides a digital output representative of the number of photons impinging such photoconductor. If the photon count produced is in the 0–128 range, the digital output signal from each photoconductor is a twelve bit word for the spatial position of the photoconductor (i.e., six bits for identifying the one of 64 rows and six bits for identifying the one of 64 columns of the matrix) and a seven bit word representing the 0–128 photon count of such photoconductor.

Thus, data source 8 provides a series of twelve bit data words and seven bit data words. By means of the matrix switch 12 as described the input lines of cable 10 containing the twelve bit words can be connected to the output lines to the channel address counter 24 so the twelve bit words specify addresses of core storage locations. At the same time the input lines of cable 10 containing the seven bit words representing the photon count are connected to the output lines to the data register 16 so that the seven bit words are treated as data words to be accumulated in the locations specified by the twelve bit words channeled to the channel address counter 24. In this fashion a "digital" profile is produced in core storage which is similar to a photographic plate which provides the position and summation of photons that impinge on the plate.

What has been described is a computer input channel system for in-line, real time data reduction. The system includes a conventional data register which normally receives data words, and a conventional channel address counter which normally increments and provides a series of ascending addresses of storage in which the data words are stored. In the present system a matrix type switching means is provided which receives the input data words and is capable of transferring such data words to either the data register, the channel address counter, or both. After describing the system, examples of hypothetical experiments were provided to illustrate how the system can be employed to use data words as addresses, to produce distribution diagrams, provide mapping, and the like.

While the invention has been particularly shown and described with reference to a preferred embodiment thereof, it will be understood by those skilled in the art that various changes in form and details may be made therein without departing from the spirit and scope of the invention.

I claim:

1. An input channel for an electronic data processor comprising a plurality of input terminals having input signals thereon,
   a data register means including a plurality of storage positions for storing data signals,
   an address register means including a plurality of storage positions for storing address signals,
   and a switching means connected to said input terminals, said data register means, and said address register means,
   said switching means selectively connecting said input signals from said input terminals to said data register means and said address register means, said input signals selectively connected to said address register means providing address information for said input signals selectively connected to said data register means.

2. An input channel for an electronic data processor comprising a plurality of input terminals having input signals thereon,
   a data register means including a plurality of storage positions for storing data signals,
   an address register means including a plurality of storage positions for storing address signals,
   a main storage means coupled to said data register means and said address register means for storing the data signals contained in said data register means at storage locations specified by said address signals contained in said address register means,
   and a switching means connected to said input terminals, said data register means, and said address register means,
   said switching means selectively connecting said input signals from said input terminals to said data register means and said address register means, said input signals selectively connected to said address register means determining the storage location in said main storage means for said input signals selectively connected to said data register means.

3. An input channel according to claim 2 wherein said switching means includes a plurality of switching elements for connecting any given one of said input terminals to any given one of said storage positions of said data register means and said address register means.

4. An input channel according to claim 3 wherein said switching means includes a control means for selectively changing the connections of said given ones of said input terminals to said given ones of said storage positions of said data register means and said address register means.

5. An input channel for an electronic data processor comprising means for providing data signals distributed on a first plurality of input lines,
   a main storage means for storing input signals at addressable storage locations,
   a data register means includes a second plurality of input lines, said data register means having an output connected to said main storage means for providing input signals thereto for storage,
   an address register means including a third plurality of input lines, said address register means having an output connected to said main storage means for providing input signals thereto for specifying storage locations,
   and switching means connected to said first plurality of input lines, said second plurality of input lines of said data register means, and said third plurality of input lines of said address register means for selectively coupling said data signals on said first plurality of input lines to given ones of said second plurality of input lines of said data register means and given ones of said third plurality of input lines of said address register means.

6. An input channel according to claim 5 wherein said data signals connected to said address register means specify address locations for said data signals connected to said data register means.

7. An input channel according to claim 5 wherein
   said switching means includes a plurality of switching elements, a separate one of said switching elements connecting each one of said first plurality of input lines to each one of said second and third plurality of input lines,
   and means for operating said switching means to connect the signal on any one of said first plurality of input lines to any one of said second and third input lines.

8. An input channel according to claim 5 wherein said first plurality of input lines connected to said switching means are arranged in rows of a matrix,
   said second and third plurality of input lines connected to said switching means are arranged in columns of said matrix,
   wherein said switching means includes a plurality of separate switching devices, each switching device located at a separate intersection of a row line and column line and adapted to electrically couple each of said row lines with each of said column lines,
   and wherein said switching means further includes means for operating said switching devices to selectively connect said row and column lines.

References Cited

UNITED STATES PATENTS

| | | | |
|---|---|---|---|
| 3,308,443 | 3/1967 | Couleur et al. | 340—172.5 |
| 3,312,950 | 4/1967 | Hillman et al. | 340—172.5 |
| 3,331,055 | 7/1967 | Betz et al. | 340—172.5 |

PAUL J. HENON, *Primary Examiner.*

RAULFE B. ZACHE, *Assistant Examiner.*